(12) United States Patent
Hsiao et al.

(10) Patent No.: US 8,985,829 B2
(45) Date of Patent: Mar. 24, 2015

(54) SIDE-EDGE BACKLIGHT MODULE

(71) Applicant: Shenzhen China Star Optoelectronics Technology Co., Ltd., Shenzhen City, Guangdong Province (CN)

(72) Inventors: Yuchun Hsiao, Shenzhen (CN); Quan Li, Shenzhen (CN)

(73) Assignee: Shenzhen China Star Optoelectronics Technology Co., Ltd., Shenzhen, Guangdong Province (CN)

(*) Notice: Subject to any disclaimer, the term of this patent is extended or adjusted under 35 U.S.C. 154(b) by 201 days.

(21) Appl. No.: 13/807,297

(22) PCT Filed: Dec. 4, 2012

(86) PCT No.: PCT/CN2012/085775
§ 371 (c)(1),
(2) Date: Dec. 27, 2012

(87) PCT Pub. No.: WO2014/040345
PCT Pub. Date: Mar. 20, 2014

(65) Prior Publication Data
US 2014/0198522 A1 Jul. 17, 2014

(30) Foreign Application Priority Data
Sep. 11, 2012 (CN) .......................... 2012 1 0334413

(51) Int. Cl.
*F21V 7/04* (2006.01)
*F21V 8/00* (2006.01)

(52) U.S. Cl.
CPC ............ *G02B 6/0085* (2013.01); *G02B 6/0091* (2013.01)

USPC .............................. 362/606; 362/612; 362/633

(58) Field of Classification Search
USPC .......... 362/606, 632, 633, 634, 580, 611, 612
See application file for complete search history.

(56) References Cited

U.S. PATENT DOCUMENTS

| 7,287,892 B1 | 10/2007 | Pang et al. | |
|---|---|---|---|
| 8,426,877 B2 * | 4/2013 | Zhang et al. | 257/88 |
| 2010/0231804 A1 * | 9/2010 | Hisakawa | 348/725 |

FOREIGN PATENT DOCUMENTS

| CN | 101131500 A | 2/2008 |
|---|---|---|
| CN | 101893785 A | 11/2010 |
| CN | 102155694 A | 8/2011 |
| JP | 11-57867 A | 3/1999 |
| JP | 2005-284106 A | 10/2005 |

* cited by examiner

*Primary Examiner* — John A Ward
(74) *Attorney, Agent, or Firm* — Cheng-Ju Chiang

(57) ABSTRACT

The present invention provides a side-edge backlight module, which includes a backplane, a backlight source arranged inside the backplane, and a light guide plate arranged inside the backplane. The backplane and the backlight source receive an aluminum-extruded heat sink arranged therebetween. The aluminum-extruded heat sink includes a first mounting section and a second mounting section perpendicularly connected to the first mounting section. The backlight source is mounted on the first mounting section. The first mounting section forms a slope surface at a location close to the second mounting section. The slope surface is arranged to extend from connection of the first and second mounting sections toward the backlight source. The side-edge backlight module forms a slope surface at a lower end of the first mounting section of the aluminum-extruded heat sink to eliminate potential interference issue of assembling occurring in the known techniques.

10 Claims, 3 Drawing Sheets

SIDE-EDGE BACKLIGHT MODULE

BACKGROUND OF THE INVENTION

1. Field of the Invention

The present invention relates to the field of liquid crystal displaying, and in particular to a side-edge backlight module.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal panel and a backlight module. The operation principle of the liquid crystal panel is that liquid crystal molecules are interposed between two parallel glass substrates and a plurality of vertical and horizontal fine electrical wires is arranged between the two glass substrates, whereby the liquid crystal molecules are controlled to change direction by application of electricity in order to refract out light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the position where light gets incident. The direct backlight module comprises a light source, such as a cold cathode fluorescent lamp (CCFL) or a light-emitting diode (LED), which is arranged at the back side of the liquid crystal panel to form a planar light source that directly provides lighting to the liquid crystal panel. The side-edge backlight module comprises a backlighting source of an LED light bar arranged at an edge of a backplane that is located rearward of one side of the liquid crystal panel. The LED light bar emits light that enters a light guide plate (LGP) through a light incident face of the light guide plate and is projected out through a light emergence face of the light guide plate, after being reflected and diffused, to thereby pass through an optic film assembly to form a planar light source for the liquid crystal panel.

The side-edge backlight module is of increasing wide applications due to the advantages of relatively low manufacturing cost and being capable of arranging a slim bezel for the liquid crystal display device. Referring to FIG. 1, a cross-sectional view is given to show a backlight source of a conventional side-edge backlight module bonded to an aluminum-extruded heat sink. Since a backlighting LED light bar 100 itself generates a great amount of heat, it must be bonded to an aluminum-extruded heat sink 500 via double-sided thermally-conductive tape 300. To lower down cost and reduce the area of a printed circuit board (PCB) 102 of the backlighting LED light bar 100, the PCB 102 is made in the form of a blade and the blade is partially inserted into the aluminum-extruded heat sink 500. The aluminum-extruded heat sink 500 forms an open slot in a corresponding portion thereof. Due to the limitation of manufacturing, burrs 508 are easily formed between a bottom board 504 and a side board 506 of the aluminum-extruded heat sink 500, leading to poor parallel and flat positioning of the PCB 102 to the side board 506 of the aluminum-extruded heat sink 500. Consequently, an angle is formed between a light emission surface of the backlighting LED light bar 100 and an incidence surface of a light guide plate (not shown), and the utilization rate of light is affected, leading to deterioration of illumination quality of the module. If additional processing is made on the aluminum-extruded heat sink, then CNC processing is necessary. This increases cost and lowers efficiency to thereby affect throughput.

SUMMARY OF THE INVENTION

An object of the present invention is to provide a side-edge backlight module, which has a simple structure, facilitates assembling of a backlight source, increases utilization rate of light from a light source, and lowers down cost.

To achieve the above object, the present invention provides a side-edge backlight module, which comprises a backplane, a backlight source arranged inside the backplane, and a light guide plate arranged inside the backplane. The backplane and the backlight source receive an aluminum-extruded heat sink arranged therebetween. The aluminum-extruded heat sink comprises a first mounting section and a second mounting section perpendicularly connected to the first mounting section. The backlight source is mounted on the first mounting section. The first mounting section forms a slope surface at a location close to the second mounting section. The slope surface is arranged to extend from connection of the first and second mounting sections toward the backlight source.

The slope surface forms an included angle of 3-8° with respect to a vertical plane.

The slope surface is formed by means of inclined pressing.

The backlight source comprises a PCB, a plurality of LED lights mounted on and electrically connected to the PCB, and a rectifier mounted on and electrically connected to the PCB.

The second mounting section forms a receiving cavity corresponding to the rectifier.

The backplane comprises a bottom board and a side board perpendicularly connected to the bottom board. The first mounting section is positioned against the side board. The second mounting section is fixed by bolts to the bottom board.

The second mounting section has an end that is distant from the first mounting section and forms a raised portion. The light guide plate is supported on the raised portion.

The side-edge backlight module further comprises a reflector plate arranged between the light guide plate and the raised portion and an optic film assembly positioned on the light guide plate.

The backlight source is bonded by thermal grease to the first mounting section.

The present invention also provides a side-edge backlight module, which comprises a backplane, a backlight source arranged inside the backplane, and a light guide plate arranged inside the backplane, the backplane and the backlight source receiving an aluminum-extruded heat sink arranged therebetween, the aluminum-extruded heat sink comprising a first mounting section and a second mounting section perpendicularly connected to the first mounting section, the backlight source being mounted on the first mounting section, the first mounting section forming a slope surface at a location close to the second mounting section, the slope surface being s arranged to extend from connection of the first and second mounting sections toward the backlight source;

wherein the slope surface forms an included angle of 3-8° with respect to a vertical plane;

wherein the slope surface is formed by means of inclined pressing;

wherein the backlight source comprises a PCB, a plurality of LED lights mounted on and electrically connected to the PCB, and a rectifier mounted on and electrically connected to the PCB;

wherein the second mounting section forms a receiving cavity corresponding to the rectifier;

wherein the backplane comprises a bottom board and a side board perpendicularly connected to the bottom board, the first mounting section being positioned against the side board, the second mounting section being fixed by bolts to the bottom board;

wherein the second mounting section has an end that is distant from the first mounting section and forms a raised portion, the light guide plate being supported on the raised portion;

further comprising a reflector plate arranged between the light guide plate and the raised portion and an optic film assembly positioned on the light guide plate; and wherein the backlight source is bonded by thermal grease to the first mounting section.

The efficacy of the present invention is that the present invention provides a side-edge backlight module, which forms a slope surface at a lower end of the first mounting section of the aluminum-extruded heat sink to eliminate potential interference issue of assembling occurring in the known techniques and maintain the light emergence surface of the backlight source and the light incidence surface of the light guide plate parallel to each other. The structure is simple and machining is easy so as to make assembling easy, the utilization rate of incident light increased, and cost reduced.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of one or more embodiments of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
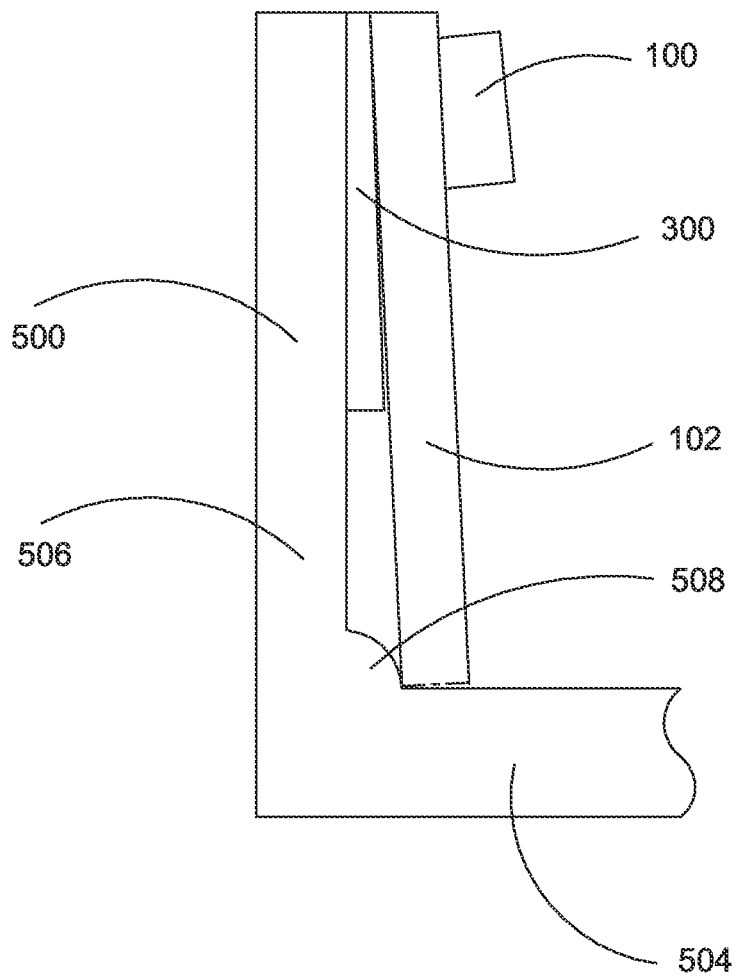
FIG. 1 is a cross-sectional view showing a backlight source of a conventional side-edge backlight module bonded to an aluminum-extruded heat sink.
Figure 2:
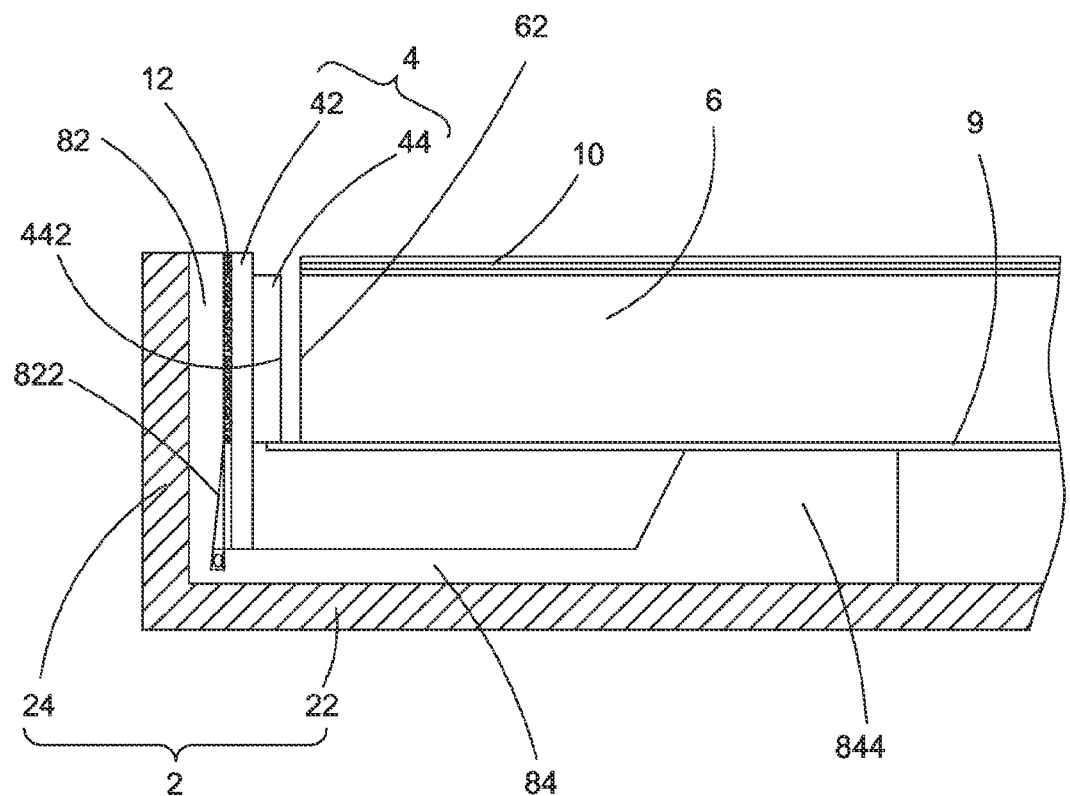
FIG. 2 is a schematic view showing the structure of a side-edge backlight module according to the present invention.
Figure 3:
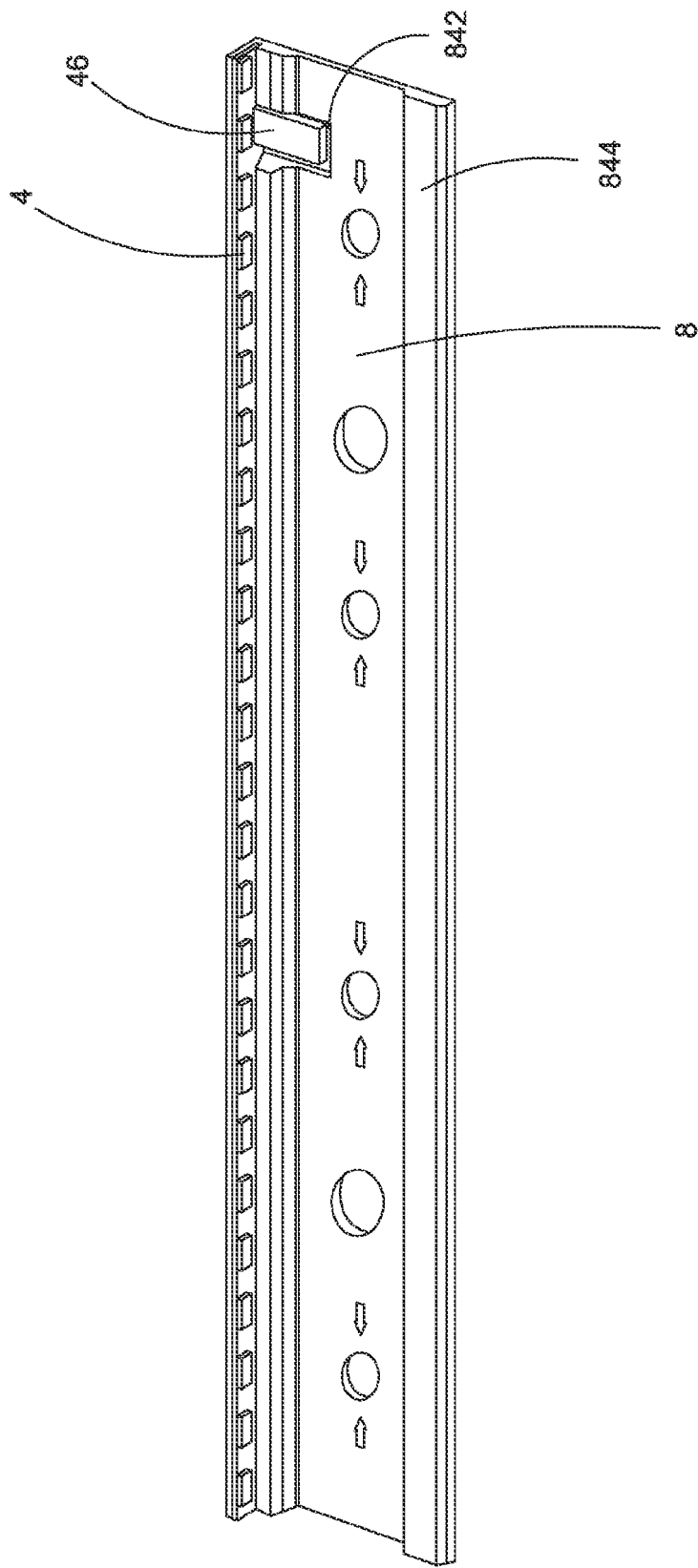
FIG. 3 is a perspective view showing and aluminum-extruded heat sink and a backlight source of the side-edge backlight module according to the present invention.

Referring to FIGS. 2 and 3, the present invention provides a side-edge backlight module, which comprises a backplane 2, a backlight source 4 arranged inside the backplane 2, and a light guide plate 6 arranged inside the backplane 2.

The backplane 2 and the backlight source 4 receive an aluminum-extruded heat sink 8 arranged therebetween. The aluminum-extruded heat sink 8 comprises a first mounting section 82 and a second mounting section 84 perpendicularly connected to the first mounting section 82. The backlight source 4 is mounted on the first mounting section 82. The first mounting section 82 forms a slope surface 822 at a location close to the second mounting section 84. The slope surface 822 is arranged to extend from the connection of the first and second mounting sections 82, 84 toward the backlight source 4.

The slope surface 822 is formed by means of inclined pressing to form an included angle α of 3-8° with respect to a vertical plane, whereby the backlight source 4, when mounted on the aluminum-extruded heat sink 8, provides a light emergence surface 442 that is parallel to a light incidence surface 62 of the light guide plate 6, thereby increasing utilization rate of light emitting from the backlight source 4 and improving illumination quality of the backlight module.

The backlight source 4 comprises a printed circuit board (PCB) 42, a plurality of LED lights 44 mounted on and electrically connected to the PCB 42, and a rectifier 46 mounted on and electrically connected to the PCB 42.

The second mounting section 84 forms a receiving cavity 842 corresponding to the rectifier 46, whereby to assemble, the rectifier 46 is received in the receiving cavity 842.

The backplane 2 comprises a bottom board 22 and a side board 24 perpendicularly connected to the bottom board 22. The first mounting section 82 is positioned against the side board 24. The second mounting section 84 is fixed by bolts (not shown) to the bottom board 22.

The second mounting section 84 has an end that is distant from the first mounting section 82 and forms a raised portion 844. The light guide plate 6 is supported on the raised portion 844.

The backlight module also comprises a reflector plate 9 arranged between the light guide plate 6 and the raised portion 844 and an optic film assembly 10 positioned on the light guide plate.

The backlight source 4 is bonded by thermal grease 12 to the first mounting section 82 to improve the effect of heat conduction and thus improving the quality of the backlight module.

In summary, the present invention provides a side-edge backlight module, which forms a slope surface at a lower end of the first mounting section of the aluminum-extruded heat sink to eliminate potential interference issue of assembling occurring in the known techniques and maintain the light emergence surface of the backlight source and the light incidence surface of the light guide plate parallel to each other. The structure is simple and machining is easy so as to make assembling easy, the utilization rate of incident light increased, and cost reduced.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A side-edge backlight module, comprising a backplane, a backlight source arranged inside the backplane, and a light guide plate arranged inside the backplane, the backplane and the backlight source receiving an aluminum-extruded heat sink arranged therebetween, the aluminum-extruded heat sink comprising a first mounting section and a second mounting section perpendicularly connected to the first mounting section, the backlight source being mounted on the first mounting section, the first mounting section forming a slope surface at a location close to the second mounting section, the slope surface being arranged to extend from connection of the first and second mounting sections toward the backlight source.

2. The side-edge backlight module as claimed in claim 1, wherein the slope surface forms an included angle of 3-8° with respect to a vertical plane.

3. The side-edge backlight module as claimed in claim 1, wherein the slope surface is formed by means of inclined pressing.

4. The side-edge backlight module as claimed in claim 1, wherein the backlight source comprises a PCB, a plurality of LED lights mounted on and electrically connected to the PCB, and a rectifier mounted on and electrically connected to the PCB.

5. The side-edge backlight module as claimed in claim 4, wherein the second mounting section forms a receiving cavity corresponding to the rectifier.

6. The side-edge backlight module as claimed in claim 1, wherein the backplane comprises a bottom board and a side board perpendicularly connected to the bottom board, the first mounting section being positioned against the side board, the second mounting section being fixed by bolts to the bottom board.

7. The side-edge backlight module as claimed in claim 1, wherein the second mounting section has an end that is distant from the first mounting section and forms a raised portion, the light guide plate being supported on the raised portion.

8. The side-edge backlight module as claimed in claim 7 further comprising a reflector plate arranged between the light guide plate and the raised portion and an optic film assembly positioned on the light guide plate.

9. The side-edge backlight module as claimed in claim 1, wherein the backlight source is bonded by thermal grease to the first mounting section.

10. A side-edge backlight module, comprising a backplane, a backlight source arranged inside the backplane, and a light guide plate arranged inside the backplane, the backplane and the backlight source receiving an aluminum-extruded heat sink arranged therebetween, the aluminum-extruded heat sink comprising a first mounting section and a second mounting section perpendicularly connected to the first mounting section, the backlight source being mounted on the first mounting section, the first mounting section forming a slope surface at a location close to the second mounting section, the slope surface being s arranged to extend from connection of the first and second mounting sections toward the backlight source;
- wherein the slope surface forms an included angle of 3-8° with respect to a vertical plane;
- wherein the slope surface is formed by means of inclined pressing;
- wherein the backlight source comprises a PCB, a plurality of LED lights mounted on and electrically connected to the PCB, and a rectifier mounted on and electrically connected to the PCB;
- wherein the second mounting section forms a receiving cavity corresponding to the rectifier;
- wherein the backplane comprises a bottom board and a side board perpendicularly connected to the bottom board, the first mounting section being positioned against the side board, the second mounting section being fixed by bolts to the bottom board;
- wherein the second mounting section has an end that is distant from the first mounting section and forms a raised portion, the light guide plate being supported on the raised portion;
- further comprising a reflector plate arranged between the light guide plate and the raised portion and an optic film assembly positioned on the light guide plate; and
- wherein the backlight source is bonded by thermal grease to the first mounting section.

* * * * *